United States Patent
Takemura

(10) Patent No.: US 8,444,197 B2
(45) Date of Patent: May 21, 2013

(54) CARGO NET DEVICE

(75) Inventor: Seiji Takemura, Settsu (JP)

(73) Assignee: Ashimori Industry Co., Ltd., Osaka-shi (JP)

( * ) Notice: Subject to any disclaimer, the term of this patent is extended or adjusted under 35 U.S.C. 154(b) by 0 days.

(21) Appl. No.: 13/143,028

(22) PCT Filed: Jan. 20, 2010

(86) PCT No.: PCT/JP2010/050618
§ 371 (c)(1),
(2), (4) Date: Jun. 30, 2011

(87) PCT Pub. No.: WO2010/092859
PCT Pub. Date: Aug. 19, 2010

(65) Prior Publication Data
US 2011/0266822 A1 Nov. 3, 2011

(30) Foreign Application Priority Data
Feb. 13, 2009 (JP) .................................. 2009-031100

(51) Int. Cl.
*B60R 21/06* (2006.01)

(52) U.S. Cl.
USPC ..................... 296/24.43; 296/37.16; 280/749; 160/290.1

(58) Field of Classification Search
USPC .................. 296/24.4, 24.43, 37.16; 160/266, 160/290.1; 280/749
See application file for complete search history.

(56) References Cited

U.S. PATENT DOCUMENTS

| 5,551,726 A | 9/1996 | Ament |
| 7,089,625 B2 * | 8/2006 | Linden et al. ................. 16/110.1 |
| 2004/0130171 A1 | 7/2004 | Zummack |

FOREIGN PATENT DOCUMENTS

| EP | 0 649 778 A1 | 4/1995 |
| EP | 1 595 738 | 11/2005 |
| JP | 2000 185600 | 7/2000 |
| JP | 2003-48487 | 2/2003 |
| JP | 2004 66884 | 3/2004 |

OTHER PUBLICATIONS

International Preliminary Report on Patentability issued on Sep. 22, 2011 in PCT/JP2010/050618 (with English Translation).
International Search Report issued Mar. 9, 2010 in PCT/JP10/50618 filed Jan. 20, 2010.
U.S. Appl. No. 13/141,580, filed Jun. 22, 2011, Takemura.
Japanese Office Action issued Oct. 30, 2012 in Japanese Patent Application No. 2009-031100, filed Feb. 13, 2009 (with Partial English translation of Office Action).

* cited by examiner

*Primary Examiner* — Dennis Pedder
(74) *Attorney, Agent, or Firm* — Oblon, Spivak, McClelland, Maier & Neustadt, L.L.P.

(57) ABSTRACT

A pair of parallel pins abutting against the inner peripheral surface of a hollow shaft are provided to a first arm part of a shank at a predetermined spacing in the longitudinal direction. This prevents the shank from tilting or rattling. Further, an insertion hole of the retaining cap and the cross section of the first arm part each have an elliptical shape, and thus the rotation of the shank with respect to the hollow shaft is restricted and the position of the shank is kept such that the interlocking part points upward.

18 Claims, 10 Drawing Sheets

F I G. 3
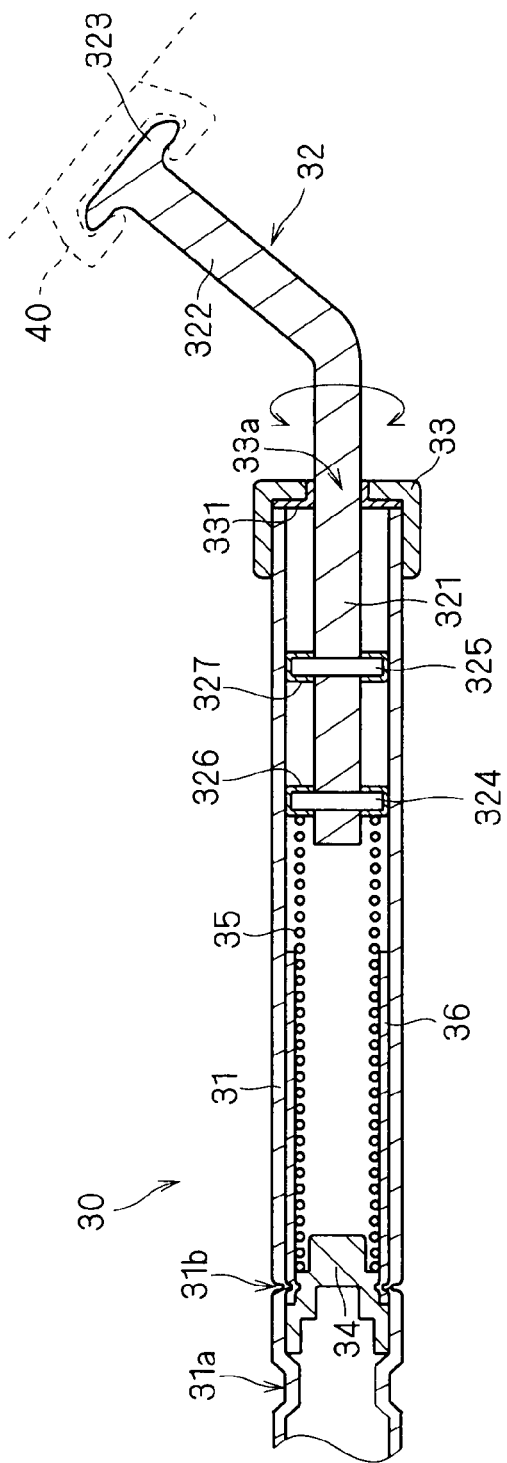

F I G . 5
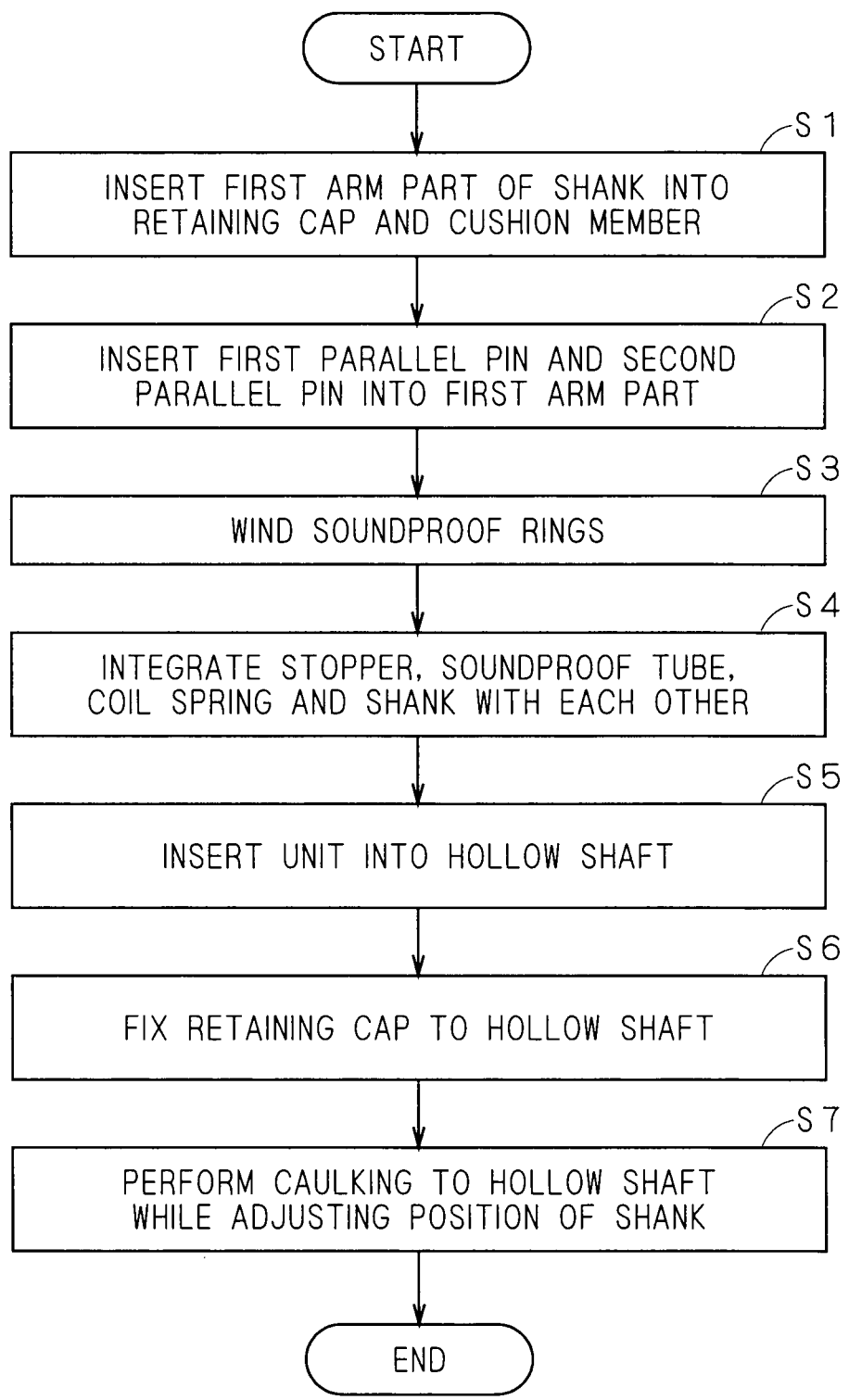

CARGO NET DEVICE

TECHNICAL FIELD

The present invention relates to a cargo net device mounted as a partition between a passenger compartment and a cargo compartment of a vehicle.

BACKGROUND ART

In a vehicle including a cargo compartment behind a passenger compartment, if the cargo is loaded on the cargo compartment exceeding the height of the back of a seat, the loaded cargo may be thrown into the passenger compartment upon, for example, sudden deceleration of the vehicle. In order to prevent the cargo from being thrown out as described above, there is known a cargo net device mounted between a passenger compartment and a cargo compartment of a vehicle.

A conventional cargo net device includes a wind-up mechanism fixed to the back of a seat, a net extended by being pulled upward from the wind-up mechanism, and a stay extended along an upper edge side of the net. The stay includes a pair of shanks capable of moving forward and backward in a longitudinal direction at both ends thereof. The portions near the outer ends of the shanks are obliquely bent, and interlocking parts interlocked to fixtures fixed to the body are formed at tips thereof.

A conventional cargo net device including a stay is disclosed in, for example, European Patent No. 064977.

SUMMARY OF THE INVENTION

Problem to be Solved by the Invention

When a cargo net device is used, first, a stay is pulled upward to pull out a net from a wind-up mechanism. Then, interlocking parts of shanks are interlocked to the fixtures on the body while adjusting the rotation positions of the shanks such that the interlocking parts point upward. On this occasion, the interlocking parts can be easily interlocked to the fixtures by restricting the rotation positions of the shanks such that the interlocking parts always point upward.

As to this point, European Patent No. 064977 describes that a tubular insert element is fitted inside a rod, and the rotation of a holding element including shanks is restricted by a groove in axial direction formed in the insert element and a projection formed in the holding element.

Unfortunately, in the configuration of European Patent No. 064977, the groove in axial direction of the insert element needs to be formed over the range in which the projection formed in the holding element slides. As a result, for a rotation restrict structure, the insert element is required to have a large dimension in a longitudinal direction. Further, the insert element for restricting the rotation is provided separately from other elements, leading to a problem that the number of components increases and the stay increases in size and weight.

While, in any cases where the cargo net device is used and is not used, in order to prevent rattling noise caused by vibrations of a vehicle, there are demands for preventing the shank from tilting or rattling in the stay.

The present invention has been made in view of the above, and an object thereof is to provide a cargo net device capable of preventing a shank from tilting or rattling as well as restricting the rotation of the shank without increasing the size of a device and the number of components or increasing the weight.

Means to Solve the Problem

In order to solve the above-mentioned problem, a first aspect of the present application relates to a cargo net device mounted as a partition between a passenger compartment and a cargo compartment of a vehicle, which includes: a net; a wind-up mechanism fixed to a back of a seat of the passenger compartment or a floor of the cargo compartment and winding up the net from a lower edge thereof; a hollow shaft extended along an upper edge side of the net and mounted in the net; a shank including a first arm part inserted into the hollow shaft so as to be slidable along a longitudinal direction thereof, and a second arm part extending from an outer end of the first arm part obliquely with respect to the longitudinal direction; and a cap fixed to an end of the hollow shaft and including an insertion hole for supporting the first arm part in a slidable manner, wherein: the first arm part includes a pair of abutting parts located at a predetermined spacing in the longitudinal direction, the pair of abutting parts abutting against an inner peripheral surface of the hollow shaft; the second arm part includes an interlocking part at an outer end thereof, the interlocking part being interlocked to a fixture fixed to a vehicle side; and the first arm part and the insertion hole of the cap are shaped so as to restrict the rotation of each other.

According to a second aspect of the present application, in the cargo net device of the first aspect, a cross section of the first arm part in a direction orthogonal to the longitudinal direction has an elliptical shape, and the insertion hole is an elliptical hole along an outer peripheral surface of the first arm part.

According to a third aspect of the present application, the cargo net device of the first aspect further includes: a fixing member fixed, in the hollow shaft, at a position apart from an end toward a center side thereof by a predetermined length; and an elastic member interposed between the fixing member and the first arm part and applying, to the fixing member and the shank, a biasing force in a direction in which the fixing member and the shank go away from each other.

According to a fourth aspect of the present application, in the cargo net device of the first aspect, the first arm part includes a cylindrical shaft core part and a molding part coating the shaft core part.

According to a fifth aspect of the present application, in the cargo net device of the first aspect, the pair of abutting parts are a pair of parallel pins inserted to pass through the first arm part in a direction orthogonal to the longitudinal direction.

According to a sixth aspect of the present application, in the cargo net device of the first aspect: the hollow shaft includes a projection projecting in the longitudinal direction from the end; the cap includes an interlocking hole into which the projection is inserted; and the cap is fixed to the hollow shaft upon the projection inserted into the interlocking hole being folded.

According to a seventh aspect of the present application, in the cargo net device of the first aspect, a unit including the fixing member, the coil spring and the shank is inserted into the hollow shaft, and the hollow shaft and the fixing member are fixed by caulking.

Effects of the Invention

According to the first invention of the present application, a pair of abutting parts abutting against the inner peripheral surface of the hollow shaft are provided in the first arm part of the shank at a predetermined spacing in the longitudinal direction. This prevents the shank from tilting or rattling. Further, according to the first aspect of the present application, the first arm part of the shank and the insertion hole of the cap are shaped so as to restrict the rotation of each other. This keeps the position of the shank such that the interlocking part points in a predetermined direction, and the interlocking part can be easily interlocked to the fixture fixed to the body. In particular, according to the first aspect of the present application, the rotation of the shank is restricted by the shapes of the first arm part and the insertion hole. Accordingly, it is not required to provide a member for restricting the rotation separately from the shank or the retaining cap, which does not increase the size of the cargo net device, the number of components or the weight.

According to the second aspect of the present application, the cross section of the first arm part in the direction orthogonal to the longitudinal direction has an elliptical shape, and the insertion hole is an elliptical hole along the outer peripheral surface of the first arm part. Accordingly, the rotation can be restricted by the shape without corners, which is preferable from the standpoint of user safety.

According to the third aspect of the present application, the shank is biased outward by the elastic member, which further prevents the shank from rattling.

According to the fourth aspect of the present application, the first arm part includes a cylindrical shaft core part and the molding part coating the shaft core part. Therefore, the first arm part having the shape to restrict the rotation can be manufactured with ease.

According to the fifth aspect of the present application, a pair of abutting parts are a pair of parallel pins inserted to pass through the first arm part in the direction orthogonal to the longitudinal direction. This enables to easily form the abutting parts at low cost.

According to the sixth aspect of the present application, the hollow shaft and the cap can be fixed firmly.

According to the seventh aspect of the present application, the unit including the fixing member, the coil spring and the shank is inserted into the hollow shaft, and then the hollow shaft and the fixing member are fixed by caulking, which enables the cargo net device to be assembled easily.

BRIEF DESCRIPTION OF DRAWINGS

FIG. 3 is another longitudinal cross-sectional view of one end of the stay and its vicinities.

FIG. 5 is a flowchart showing the process of stay assembly.

EMBODIMENTS FOR CARRYING OUT THE INVENTION

Preferred embodiments of the present invention are described below with reference to the drawings.

<1. Overall Configuration of Cargo Net Device>

Figure 1:
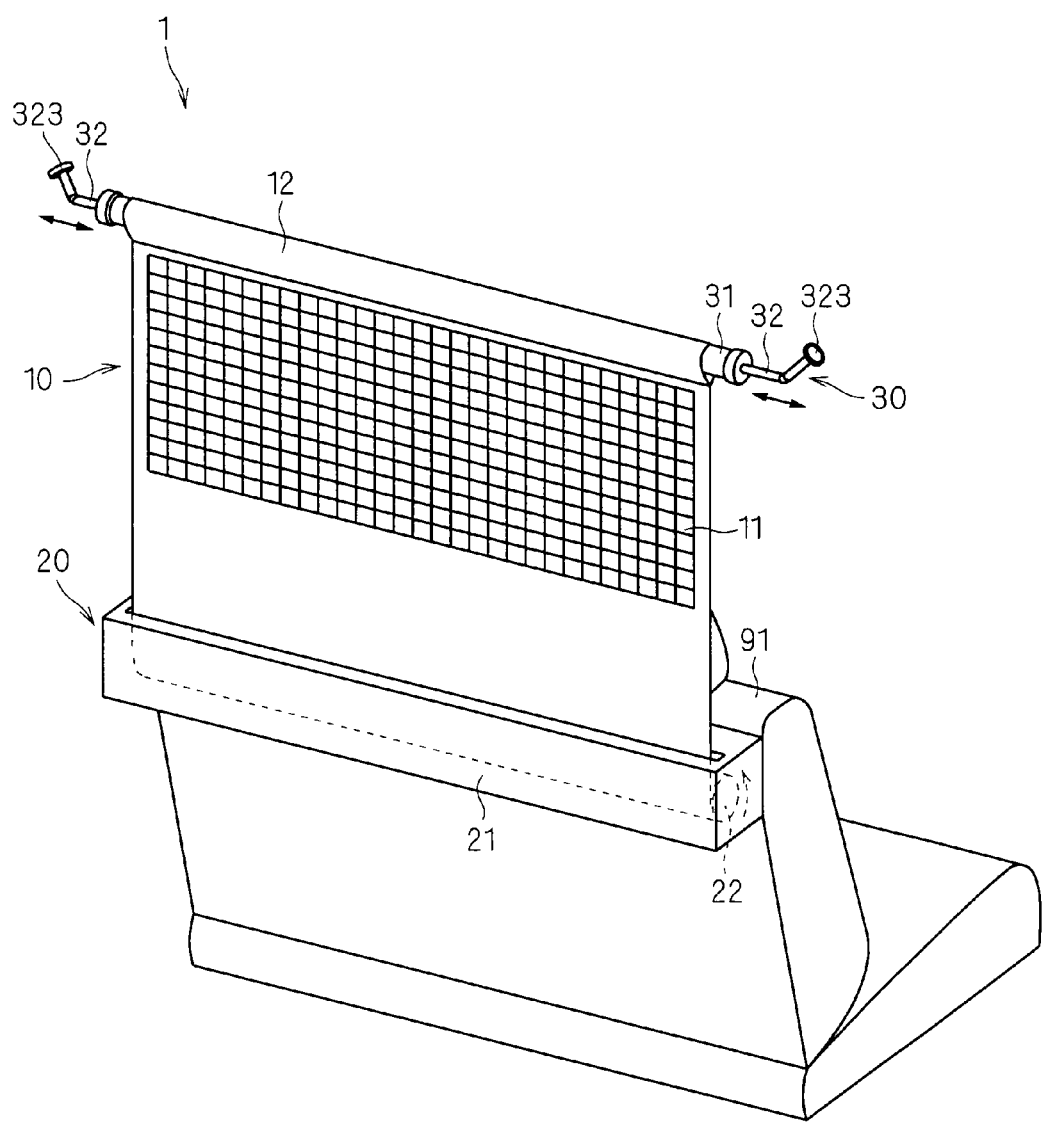
FIG. 1 is a perspective view of a cargo net device.

FIG. 1 is a perspective view of a cargo net device 1 according to an embodiment of the present invention. The cargo net device 1 is mounted as a partition between a passenger compartment and a cargo compartment of a vehicle for preventing the cargo loaded on the cargo compartment in the back of the vehicle from being thrown into the passenger compartment forward. As shown in FIG. 1, the cargo net device 1 mainly includes a net 10, a wind-up mechanism 20 and a stay 30.

The net 10 is a sheet-like member extended between the passenger compartment and the cargo compartment. The net 10 is formed, approximately in a rectangular shape, of fibers or a resin having the strength sufficient for standing the pressure from the cargo. The net 10 includes a netted window part 11. This allows a driver to have a good rear visibility through the window part 11 even in a state in which the net 10 is extended.

The lower edge of the net 10 is fixed to a wind-up shaft 22 of the wind-up mechanism 20, which is described below. The net 10 includes a bag part 12 sewn in a tubular shape that is formed in an upper edge thereof, and a hollow shaft 31 of the stay 30, which is described below, is inserted into the bag part 12.

The wind-up mechanism 20 is a mechanism for winding up the net 10 from the lower edge thereof to house the net 10 therein. The wind-up mechanism 20 includes a housing part 21 that is detachably fixed to the back of a seat 91 of the vehicle and the wind-up shaft 22 disposed inside the housing part 21. The wind-up shaft 22 holds the edge side of the lower portion of the net 10 and is biased in a direction (rotation direction indicated by a broken line in FIG. 1) for winding up the net 10. Further, the wind-up shaft 22 is provided with a lock mechanism (not shown) for restricting pulling of the net 10 upon application of an abrupt force in the direction in which the net 10 is pulled out.

The stay 30 is a portion that is extended along the upper edge side of the net 10 and serves as a handle when the net 10 is pulled out and extended. The stay 30 includes the hollow shaft 31 that is inserted into the bag part 12 formed in the upper edge of the net 10 and has an approximately cylindrical shape and a pair of shanks 32 partially inserted into the both ends of the hollow shaft 31.

The pair of shanks 32 slide in the longitudinal direction with respect to the hollow shaft 31, which allows the stay 30 to be retractable in the longitudinal direction (direction indicated by a solid arrow in FIG. 1). Further, an interlocking part 323 that is interlocked to a fixture 40 (see FIG. 3) fixed to the ceiling or side of the vehicle is formed at the outer end of the shank 32.

When the cargo net device 1 is mounted inside the vehicle, first, the wind-up mechanism 20 is fixed to the back of the seat 91. Then, the net 10 is pulled upward from the wind-up mechanism 20, and the interlocking parts 323 provided at both ends of the stay 30 are interlocked to the fixtures 40 (see FIG. 3) on the body and fixed.

As described above, the stay 30 is retractable in the longitudinal direction. This allows the stay 30 to extend and contract in accordance with a vehicle size, which can change the fixed positions of the interlocking parts 323.

<2. Structure of Stay>

Figure 2:
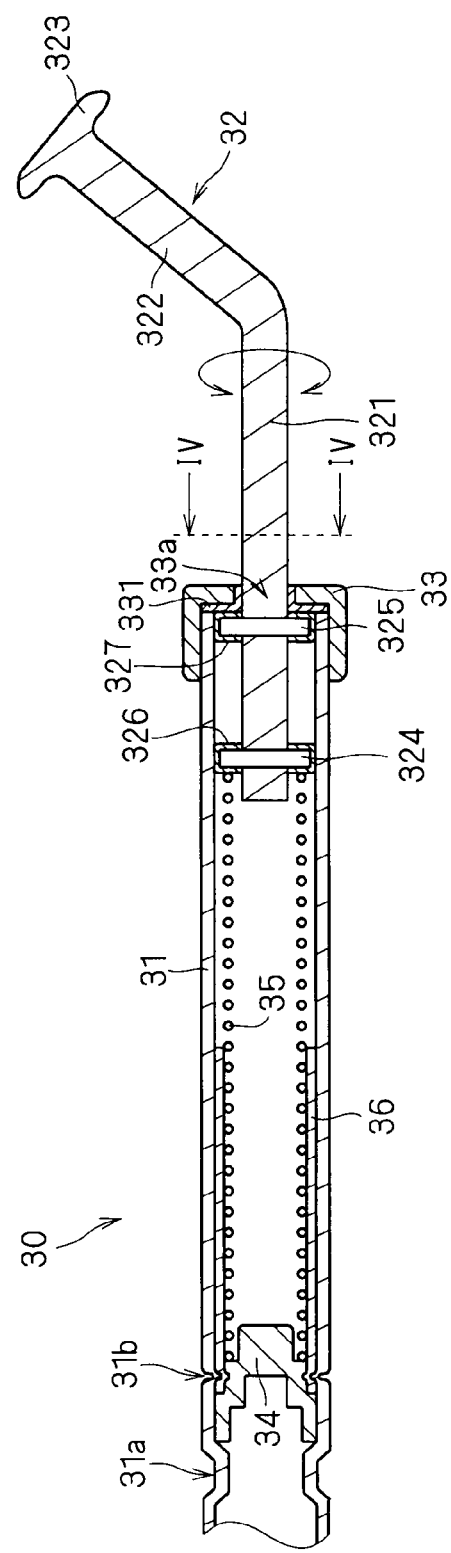
FIG. 2 is a longitudinal cross-sectional view of one end of a stay and its vicinities.

Next, a detailed structure of the stay 30 is described. FIG. 2 and FIG. 3 are longitudinal cross-sectional views of one end of the stay 30 and its vicinities. FIG. 2 shows the stay 30 in a state in which the interlocking part 323 is not interlocked to the fixture 40 (that is, state in which an external force in a direction for pushing does not act on the shank 32). While, FIG. 3 shows the stay 30 in a state in which the interlocking part 323 is interlocked to the fixture 40.

As described above, the stay 30 includes the hollow shaft 31 and the shanks 32 that slide in the longitudinal direction with respect to the hollow shaft 31. The hollow shaft 31 is formed of, for example, metals such as stainless steel. As shown in FIG. 2 and FIG. 3, the stay 30 further includes retaining caps 33 fixed to the ends of the hollow shaft 31, and stoppers 34, coil springs 35 and soundproof tubes 36 that are disposed inside the hollow shaft 31.

The shank 32 is a bent cylindrical body that includes a first arm part 321 inserted into the hollow shaft 31 in a slidable manner along the longitudinal direction and a second arm part 322 extending from the outer end of the first arm part 321 obliquely upward with respect to the longitudinal direction. Formed at the outer end of the second arm part 322 is the flange-shaped interlocking part 323.

Figure 4:
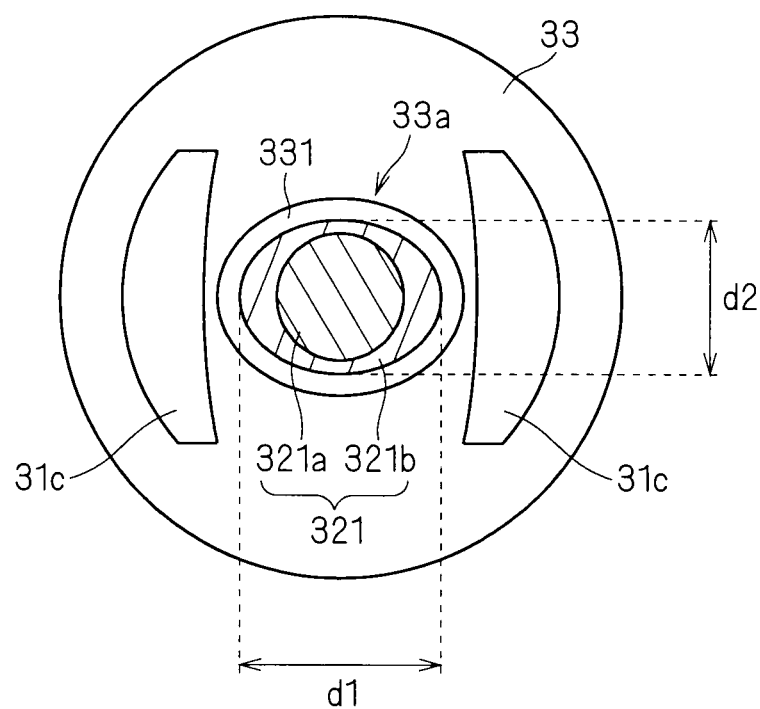
FIG. 4 is a longitudinal cross-sectional view of a shank, which is viewed from a position IV-IV of FIG. 2.

FIG. 4 is a longitudinal cross-sectional view of the shank 32, which is viewed from a position IV-IV of FIG. 2. As shown in FIG. 4, the first arm part 321 of the shank 32 has an elliptical cross section in which a horizontal length d1 is larger than a vertical length d2. That is, the first arm part 321 of the shank 32 is an elliptical column in which the horizontal thickness is larger than the vertical thickness.

The first arm part 321 according to the present embodiment has a structure in which a metal shaft core part 321a is coated with a resin-made molding part 321b. In manufacturing the first arm part 321 of the shank 32, the outer peripheral surface of the shaft core part 321a is covered with the molding part 321b, and the outer peripheral surface of the molding part 321b is formed such that an elliptical column is obtained as a whole. As a result, the first arm part 321 having an elliptical column shape can be manufactured easily without forming the metal shaft core part 321a itself into an elliptical column shape.

The description returns to FIG. 2 and FIG. 3. The first arm part 321 of the shank 32 is provided with metal first parallel pin 324 and second parallel pin 325 that are inserted to pass therethrough in the direction orthogonal to the longitudinal direction. In addition, resin-made soundproof rings 326 and 327 are wound at the positions of the first arm part 321, where the first parallel pin 324 and second parallel pin 325 are provided, respectively. The first parallel pin 324 and the second parallel pin 325 slide in the longitudinal direction along the inner peripheral surface of the hollow shaft 31 while abutting against the inner peripheral surface of the hollow shaft 31 via the soundproof rings 326 and 327, respectively.

The first parallel pin 324 also abuts against the end of the coil spring 35 via the soundproof ring 326 and serves as a portion that receives the biasing force from the coil spring 35 to the shank 32. While, the second parallel pin 325 serves as a portion that abuts against the retaining cap 33 via the soundproof ring 327 and a cushion member 331 described below in the state (state of FIG. 2) in which the interlocking part 323 is not interlocked to the fixture 40.

The first parallel pin 324 and the second parallel pin 325 are provided at a predetermined spacing in the longitudinal direction of the first arm part 321. Accordingly, the first parallel pin 324 and the second parallel pin 325 abut against the inner peripheral surface of the hollow shaft 31 via the soundproof rings 326 and 327, respectively, which prevents the shank 32 from tilting or rattling.

The retaining cap 33 is a metal member fixed to the end of the hollow shaft 31. The retaining cap 33 has an insertion hole 33a for slidably supporting the first arm part 321 of the shank 32. The resin-made cushion member 331 is inserted between the end surface of the hollow shaft 31 and the retaining cap 33. The cushion member 331 includes a disc part positioned between the end surface of the hollow shaft 31 and the retaining cap 33 and a cylindrical part positioned between the first arm part 321 of the shank 32 and the retaining cap 33.

The inner end surface of the retaining cap 33 abuts against the second parallel pin 325 via the cushion member 331 and the soundproof ring 327 in the state of FIG. 2. This prevents the shank 32 from extending by a larger amount compared with the state shown in FIG. 2. Further, the cushion member 331 serves the function of reducing the noise caused by the sliding contact between the first arm part 321 and the retaining cap 33 and the noise caused by the abutting contact between the second parallel pin 325 and the retaining cap.

Further, the shank 32 is also supported by the insertion hole 33a of the retaining cap 33, in addition to the first parallel pin 324 and the second parallel pin 325. That is, the shank 32 is supported at three positions of the first parallel pin 324, the second parallel pin 325 and the retaining cap 33 with respect to the hollow shaft. This further prevents the shank 32 from tilting or rattling.

As shown in FIG. 4, the insertion hole 33a of the retaining cap 33 is an elliptical hole along the outer peripheral surface of the first arm part 321. This enables the retaining cap 33 to restrict the rotation of the first arm part 321 while allowing sliding of the first arm part 321 having an elliptical column shape. That is, in the present embodiment, the first arm part 321 having an elliptical column shape is inserted into the elliptical insertion hole 33a having a elliptical shape, with the result that the rotation of the shank 32 with respect to the hollow shaft 31 is restricted.

As shown in FIG. 2 and FIG. 3, the shank 32 according to the present embodiment is disposed in a position (hereinafter, referred to as a "standard position") such that the interlocking part 323 points upward. Further, as described above, the insertion hole 33a of the retaining cap 33 and the first arm part 321 of the shank 32 are shaped so as to restrict the rotation of each other. Therefore, even in a case where the external force in the rotation direction acts on the second arm part 322, the first arm part 321 does not rotate with respect to the hollow shaft 31 and the retaining cap 33, and the shank 32 is kept in the standard position.

The first arm part 321 of the shank 32 has a uniform cross-sectional shape over the longitudinal direction thereof. Therefore, the shank 32 is kept in the standard position in the state (state of FIG. 2) in which the interlocking part 323 is not interlocked to the fixture 40 as well as in the state (state of FIG. 3) in which the interlocking part 323 is interlocked to the fixture 40.

In the cargo net device 1 according to the present embodiment, the shank 32 is always kept in the standard position when the net 10 is pulled out from the wind-up mechanism 20 to fix the stay 30 to the fixture 40. As a result, a user does not need to manually adjust the rotation position of the shank 32. It is also possible for the user to, for example, lift the stay 30 with one hand not with both hands and subsequently interlock the interlocking part 323 to the fixture 40.

Further, in the present embodiment, the rotation of the shank 32 is restricted by the shapes of the first arm part 321 and the insertion hole 33a. The member for restricting the rotation is not provided separately from the shank 32 and the retaining cap 33, which does not increase the size of the stay 30 and the number of components or weight.

The stopper 34 is a member (fixing member) that is fixed to the inside of the hollow shaft 31 and supports an inner end 35a of the coil spring 35 in a fixed manner. The stopper 34 is fixed at the position at a predetermined spacing from the end of the hollow shaft 31 toward the center thereof. In addition, the stopper 34 abuts against the inner side surface of a recess 31a formed in the hollow shaft 31 and is fixed to the hollow shaft 31 by a caulking part 31b.

The coil spring 35 is an elastic member inserted between the stopper 34 and the shank 32 inside the hollow shaft 31. The end 35a (hereinafter, referred to as a "fixed end 35a") inside the coil spring 35 abuts against the stopper 34. While, an outer end 35b (hereinafter, referred to as a "free end 35b") of the coil spring 35 abuts against the first parallel pin 324 via the soundproof ring 326.

The coil spring 35 is interposed between the stopper 34 and the shank 32 in the state of being compressed compared with the natural length. This allows the coil spring 35 to apply the biasing force to the stopper 34 and the shank 32 in the direction in which they go away from each other. As a result, the shank 32 is biased in the direction in which it is pushed out of the hollow shaft 31.

In a case where the stay 30 is not mounted to the fixture 40, the coil spring 35 extends (in a range shorter than the natural length) and, as shown in FIG. 2, the second parallel pin 325 of the shank 32 abuts against the retaining cap 33 via the soundproof ring 327 and the cushion member 331. While, in a case where the stay 30 is mounted to the fixture 40, as shown in FIG. 3, the coil spring 35 is compressed more compared with the state shown in FIG. 2, in accordance with the position of the fixture 40.

In the state of FIG. 3, the shank 32 presses the fixture 40 outward by the biasing force applied from the coil spring 35. As a result, the stay 30 is tightened between a pair of fixtures 40. This prevents the stay 30 from rattling.

A soundproof tube 36 is a resin-made cylindrical member that is fixed to the inner peripheral surface of the hollow shaft 31. The hollow shaft 31, soundproof tube 36 and stopper 34 are fixed by caulking in the step of assembling the stay 30 described below. The soundproof tube 36 is arranged between the inner peripheral surface of the hollow shaft 31 and the coil spring 35, which prevents the inner peripheral surface of the hollow shaft 31 and the coil spring 35 from directly contacting each other to reduce the noise generated caused by the extension and contraction and torsion of the coil spring 35.

Note that while FIG. 2 and FIG. 3 show the structure of one end of the stay 30 and its vicinities, the other end and its vicinities have a similar structure as well.

<3. Assembly Process of Stay>

Next, the assembly process of the stay 30 is described with reference to the flowchart of FIG. 5 and the perspective views of FIG. 6 to FIG. 12.

Figure 6:
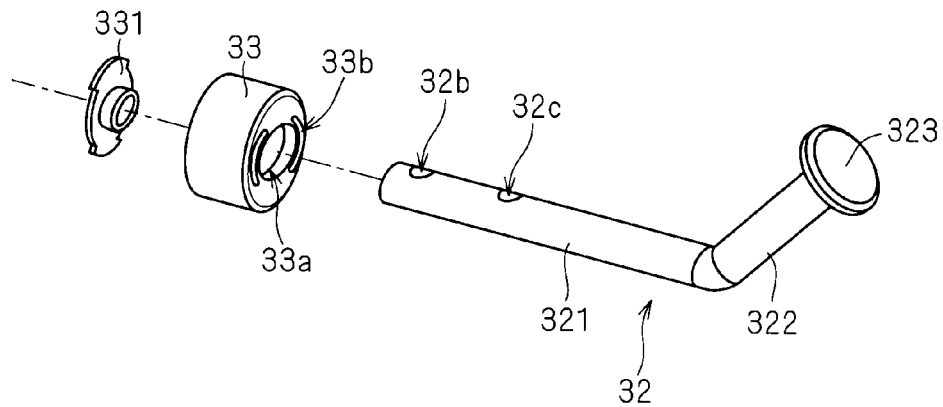
FIG. 6 is a perspective view showing the state of stay assembly.
Figure 7:
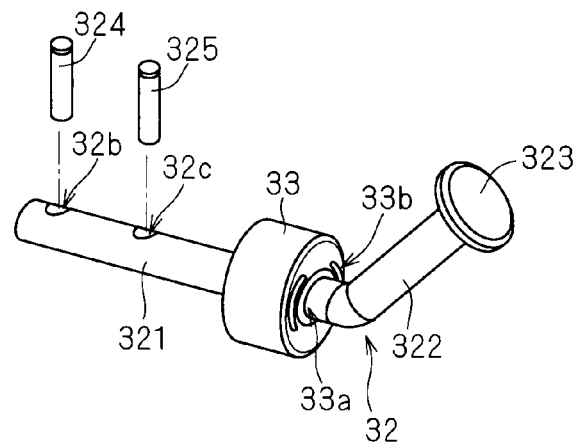
FIG. 7 is a perspective view showing the state of stay assembly.

In assembly of the stay 30, first, the first arm part 321 of the shank 32 is inserted into the retaining cap 33 and the cushion member 331 (Step S1, FIG. 6). Then, the first parallel pin 324 and the second parallel pin 325 are inserted into two insertion holes 32b and 32c that are formed in the first arm part 321 of the shank 32 at a spacing in the axis direction (Step S2, FIG. 7).

Figure 8:
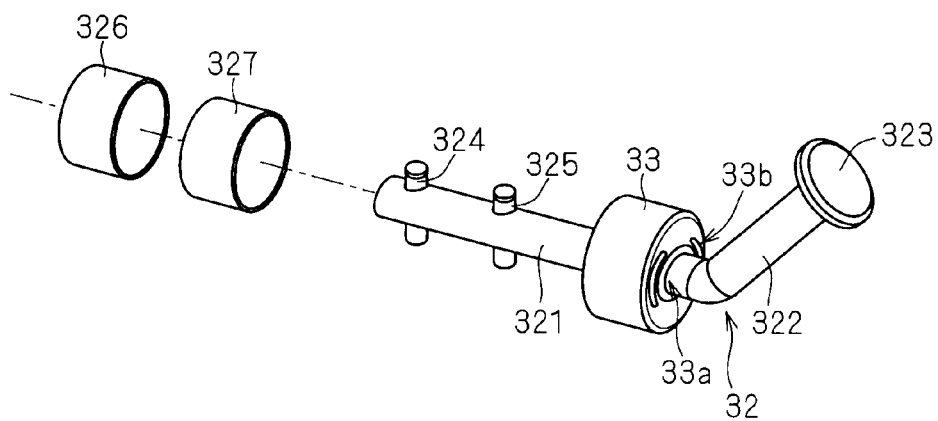
FIG. 8 is a perspective view showing the state of stay assembly.
Figure 9:
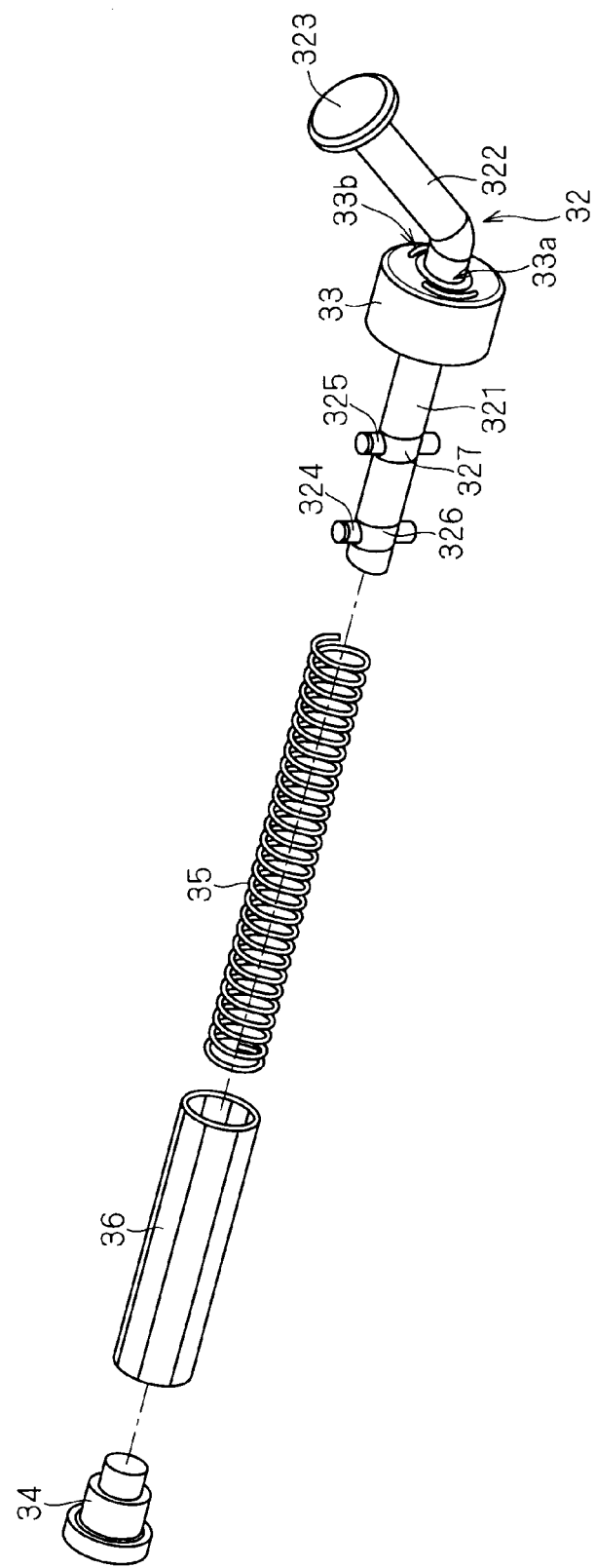
FIG. 9 is a perspective view showing the state of stay assembly.

Then, the soundproof rings 326 and 327 are wound at the positions of the first arm part 321 where the first parallel pin 324 and the second parallel pin 325 are inserted, respectively (Step S3, FIG. 8). The soundproof rings 326 and 327, which are made of, for example, a heat-shrinkable resin, are inserted into the first arm part 321 and then applied with heat so as to adhere to the first parallel pin 324 and the second parallel pin 325, respectively.

Subsequently, the soundproof tube 36 is integrated with the stopper 34, and then the coil spring 35 is inserted into the soundproof tube 36. Then, the coil spring 35 is sandwiched between the stopper 34 and the first parallel pin 324 fixed to the first arm part 321 of the shank 32 (Step S4, FIG. 9).

Figure 10:
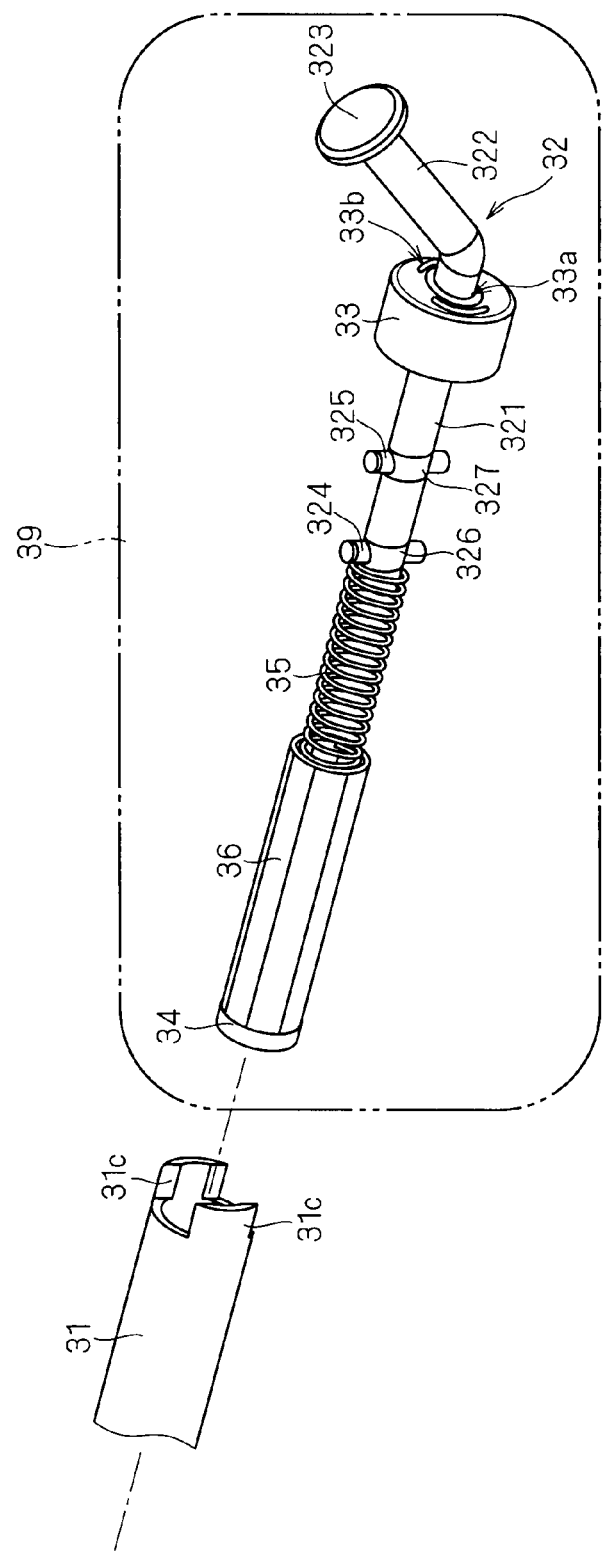
FIG. 10 is a perspective view showing the state of stay assembly.
Figure 11:
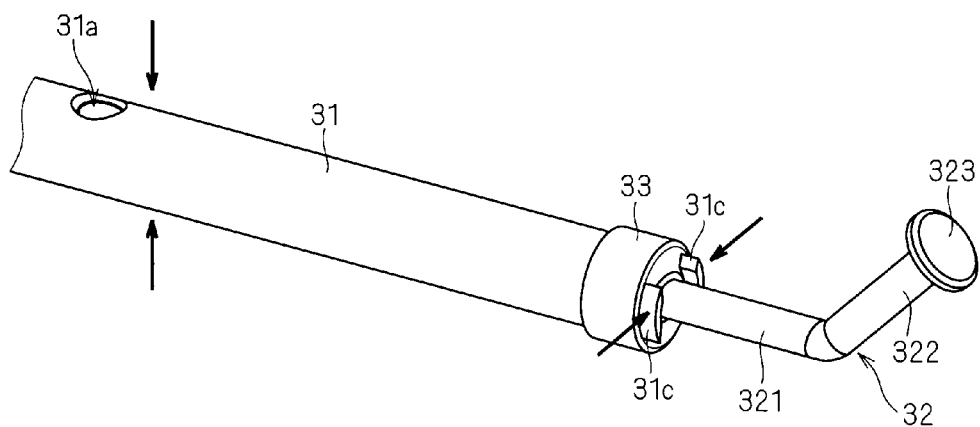
FIG. 11 is a perspective view showing the state of stay assembly.

After that, a unit 39 including the stopper 34, the soundproof tube 36, the coil spring 35 and the shank 32 is inserted into the hollow shaft 31 (Step S5, FIG. 10). The stopper 34 is inserted to reach the inner side surface of the recess 31a of the hollow shaft 31. The retaining cap 33 is pushed to reach the position of the end of the hollow shaft 31, whereby the coil spring 35 is compressed more compared with the natural length. The retaining cap 33 and the hollow shaft 31 are integrated with each other by inserting projections 31c formed in the hollow shaft 31 into interlocking holes 33b formed in the retaining cap 33.

Further, the projections 31c inserted into the interlocking holes 33b of the retaining cap 33 are folded inward by caulking. As a result, the retaining cap 33 is fixed to the hollow shaft 31 (Step S6, FIG. 11). In addition, caulking is performed at the location of the hollow shaft 31 on the side slightly closer to the end compared with the recess 31a (Step S7, FIG. 11). This allows the soundproof tube 36 and the stopper 34 to be fixed to the hollow shaft 31 more firmly.

Figure 12:
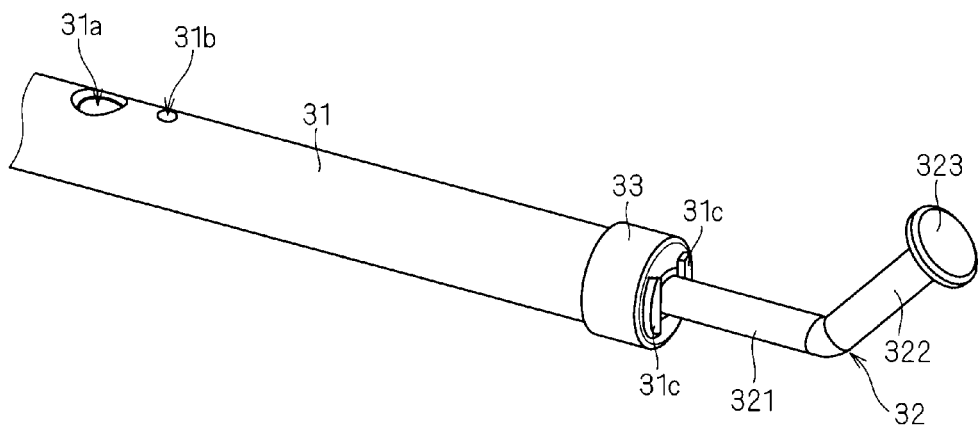
FIG. 12 is a perspective view showing the state of stay assembly.

As a result, the assembly of the stay 30 is finished (FIG. 12).

As described above, in the present embodiment, the stopper 34, the soundproof tube 36, the coil spring 35 and the shank 32 can be integrated into the unit 39. In assembling the stay 30, the above-mentioned unit 39 is inserted into the hollow shaft 31, and then the hollow shaft 31, the soundproof tube 36 and the stopper 34 are fixed by caulking. This allows the stay 30 to be assembled easily.

<4. Modifications>

While one embodiment of the present invention is described above, the present inventiion is not limited to the above-mentioned embodiment.

Figure 13:
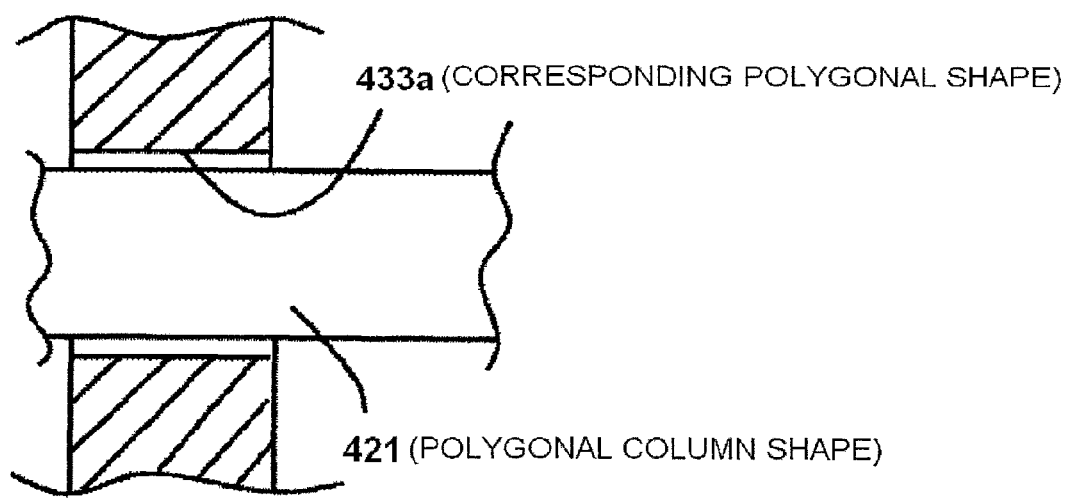
FIG. 13 is a perspective view showing the state of stay assembly.

While the cross section of the first arm part 321 of the shank 32 the insertion hole 33a of the retaining cap 33 both have an elliptical shape in the above-mentioned embodiment, the first arm part 321 and the insertion hole 33a may have the other shape. For example, the first arm part 321 may have a polygonal column shape, whereas the insertion hole 33a may have a polygonal shape along the outer peripheral surface of the first arm part 321 (see, FIG. 13, a first arm part 421 and an insertion hole 433a). Note that if the first arm part 321 is formed into an elliptical column shape as in the above-mentioned embodiment, the rotation can be restricted by the shape without corners, which is preferable from the standpoint of user safety.

Further, the first arm part 321 and the insertion hole 33a may have shapes different from each other as long as they each have a restriction surface restricting the rotation of each other.

While the net 10 is formed approximately in a rectangular shape in the above-mentioned embodiment, the net 10 may be formed in the other shape. For example, the net 10 may be formed in a trapezoidal shape in accordance with the shape of a vehicle.

Further, while the wind-up mechanism 20 is fixed to the back of the seat 91 in the above-mentioned embodiment, the wind-up mechanism 20 may be fixed to the floor of the cargo compartment.

Further, while a pair of shanks 32 provided at both ends of the hollow shaft 31 are slidable in the longitudinal direction with respect to the hollow shaft 31 in the above-mentioned embodiment, it suffices that at least one of the shanks 32 is slidable in the longitudinal direction with respect to the hollow shaft 31.

Further, while the state in which the interlocking part 323 points upward is taken as the standard position of the shank 32 in the above-mentioned embodiment, the position for facilitating interlocking thereof may be taken as the standard position in accordance with the shapes of the fixture 40 and the interlocking part 323. Accordingly, the state in which the interlocking part 323 points in the direction other than upward direction may be taken as the standard position of the shank 32.

Further, while a pair of parallel pins 324 and 325 inserted into the first arm part 321 of the shank 32 abut against the inner peripheral surface of the hollow shaft 31 in the above-mentioned embodiment, abutting members having other shape may be provided in the first arm part 321, in place of those parallel pins 324 and 325. For example, a pair of flanged members may be fixed to the first arm part 321 at a spacing such that the end surfaces of the flanged members abut against the inner peripheral surface of the hollow shaft 31. Note that if a pair of parallel pins 324 and 325 are inserted into the first arm part 321 as in the above-mentioned embodiment, it is possible to easily form an abutting part against the hollow shaft 31 at low cost. Note that the number of parallel pins or flanged members provided in the first arm part may be three or more.

Further, while the coil spring 35 is used as the member for biasing the shank 32 in the above-mentioned embodiment, the other member having elasticity may be used in place of the coil spring 35.

DESCRIPTION OF REFERENCE SYMBOLS 1 cargo net device
10 net
20 wind-up mechanism
30 stay
31 hollow shaft
31a recess
31b caulking part
32 shank
33 retaining cap
33a insertion hole
34 stopper
35 coil spring
36 soundproof tube
39 unit
40 fixture
321 first arm part
321a shaft core part
321b molding part
322 second arm part
323 interlocking part
324 first parallel pin
325 second parallel pin
326, 327 soundproof ring
331 cushion member

The invention claimed is:

1. A cargo net device mounted as a partition between a passenger compartment and a cargo compartment of a vehicle, comprising:
   a net;
   a wind-up mechanism fixed to a back of a seat of said passenger compartment or a floor of said cargo compartment and winding up said net from a lower edge thereof;
   a hollow shaft extended along an upper edge side of said net and attached to said net;
   a shank including:
      a first arm part inserted into said hollow shaft so as to be slidable along a longitudinal direction thereof; and
      a second arm part extending from an outer end of said first arm part obliquely with respect to said longitudinal direction; and
   a cap fixed onto an end of said hollow shaft, the cap including a first part surrounding an outer peripheral surface of said hollow shaft and a second part covering an opening of said hollow shaft, said second part having an insertion hole that supports said first arm part in a slidable manner, wherein:
   said first arm part includes a pair of abutting parts located at a predetermined spacing in said longitudinal direction, the pair of abutting parts abutting against an inner peripheral surface of said hollow shaft;
   said second arm part includes an interlocking part at an outer end thereof, the interlocking part being interlocked to a fixture fixed to a vehicle side; and
   said first arm part has an elliptical column shape or a polygonal column shape, and said insertion hole of said cap has a corresponding elliptical shape or a corresponding polygonal shape along an outer peripheral surface of said first arm part, such that said first arm part and said insertion hole of said cap are shaped so as to restrict rotation of each other.

2. The cargo net device according to claim 1, further comprising:
   a fixing member fixed, in said hollow shaft, at a position apart from an end toward a center side thereof by a predetermined length; and
   an elastic member interposed between said fixing member and said first arm part and applying, to said fixing member and said shank, a biasing force in a direction in which said fixing member and said shank go away from each other.

3. The cargo net device according to claim 1, wherein said first arm part includes a cylindrical shaft core part and a molding part coating said cylindrical shaft core part.

4. The cargo net device according to claim 1, wherein said pair of abutting parts are a pair of parallel pins inserted to pass through said first arm part in a direction orthogonal to said longitudinal direction.

5. The cargo net device according to claim 1, wherein:
   said hollow shaft includes a projection projecting in the longitudinal direction from said end;
   said cap includes an interlocking hole into which said projection is inserted; and
   said cap is fixed to said hollow shaft upon said projection inserted into said interlocking hole being folded.

6. The cargo net device according to claim 1, wherein:
   a unit including said fixing member, a coil spring and said shank is inserted into said hollow shaft; and
   said hollow shaft and said fixing member are fixed by caulking.

7. The cargo net device according to claim 1, further comprising a cushion member disposed in contact with and between the first arm part and the cap.

8. The cargo net device according to claim 2, further comprising a soundproof tube fixed within the inner peripheral surface of the hollow shaft, wherein the soundproof tube is disposed between the inner peripheral surface of the hollow shaft and the elastic member.

9. The cargo net device according to claim 3, wherein the molding part coats both the cylindrical core part and another portion of a core part of the first arm part, the molding part restricting rotation of the first arm part with respect to the insertion hole.

10. A cargo net device mounted as a partition between a passenger compartment and a cargo compartment of a vehicle, comprising:
 a net;
 a wind-up mechanism fixed to a back of a seat of said passenger compartment or a floor of said cargo compartment and winding up said net from a lower edge thereof;
 a hollow shaft extended along an upper edge side of said net and mounted in said net;
 a shank including:
  a first arm part inserted into said hollow shaft so as to be slidable along a longitudinal direction thereof; and
  a second arm part extending from an outer end of said first arm part obliquely with respect to said longitudinal direction; and
 a cap fixed onto an end of said hollow shaft and including an insertion hole for supporting said first arm part in a slidable manner,
 wherein said first arm part includes a pair of abutting parts located at a predetermined spacing in said longitudinal direction, the pair of abutting parts abutting against an inner peripheral surface of said hollow shaft, and said pair of abutting parts including a pair of parallel pins inserted to pass through said first arm part in a direction orthogonal to said longitudinal direction,
 wherein said second arm part includes an interlocking part at an outer end thereof, the interlocking part being interlocked to a fixture fixed to a vehicle side, and
 wherein said first arm part and said insertion hole of said cap are shaped so as to restrict the rotation of each other.

11. The cargo net device according to claim 10, wherein a cross section of said first arm part in a direction orthogonal to the longitudinal direction has an elliptical shape, and wherein said insertion hole is an elliptical hole along an outer peripheral surface of said first arm part.

12. The cargo net device according to claim 10, further comprising:
 a fixing member fixed, in said hollow shaft, at a position apart from an end toward a center side thereof by a predetermined length; and
 an elastic member interposed between said fixing member and said first arm part, and the elastic member applying, to said fixing member and said shank, a biasing force in a direction in which said fixing member and said shank go away from each other.

13. The cargo net device according to claim 10, wherein said first arm part includes a cylindrical shaft core part and a molding part coating said cylindrical shaft core part.

14. The cargo net device according to claim 10, wherein said hollow shaft includes a projection projecting in the longitudinal direction from said end,
 wherein said cap includes an interlocking hole into which said projection is inserted, and
 wherein said cap is fixed to said hollow shaft upon said projection inserted into said interlocking hole being folded.

15. The cargo net device according to claim 10, wherein a unit including said fixing member, a coil spring, and said shank is inserted into said hollow shaft, and
 wherein said hollow shaft and said fixing member are fixed by caulking.

16. The cargo net device according to claim 10, further comprising a cushion member disposed in contact with and between the first arm part and the cap.

17. The cargo net device according to claim 13, wherein the molding part coats both the cylindrical core part and another portion of a core part of the first arm part, the molding part restricting rotation of the first arm part with respect to the insertion hole.

18. The cargo net device according to claim 14, wherein the projection inserted into the interlocking hole is folded inward.

* * * * *